(12) United States Patent
Thottupurathu

(10) Patent No.: US 7,942,275 B2
(45) Date of Patent: May 17, 2011

(54) EXPANDED PFTE MEMBRANE AND METHOD OF MAKING

(75) Inventor: Gopakumar Thottupurathu, Overland Park, KS (US)

(73) Assignee: BHA Group, Inc., Kansas City, MO (US)

( * ) Notice: Subject to any disclaimer, the term of this patent is extended or adjusted under 35 U.S.C. 154(b) by 316 days.

(21) Appl. No.: 12/169,391

(22) Filed: Jul. 8, 2008

(65) Prior Publication Data

US 2010/0006497 A1    Jan. 14, 2010

(51) Int. Cl.
| B01D 39/00 | (2006.01) |
| D02J 1/06 | (2006.01) |
| B27J 5/00 | (2006.01) |

(52) U.S. Cl. ........... 210/500.36; 210/500.27; 428/315.5; 264/288.8; 264/127; 264/210.6

(58) Field of Classification Search ............. 210/500.36, 210/500.27; 264/127, 288.8, 210.7, 210.6; 428/311.51, 315.5
See application file for complete search history.

(56) References Cited

U.S. PATENT DOCUMENTS

| 3,953,566 A | 4/1976 | Gore |
| 4,187,390 A * | 2/1980 | Gore .......................... 174/102 R |
| 4,385,093 A | 5/1983 | Hubis |
| 4,478,665 A | 10/1984 | Hubis |
| 5,098,625 A * | 3/1992 | Huang et al. ................... 264/127 |
| 5,476,589 A | 12/1995 | Bacino |
| 5,552,100 A * | 9/1996 | Shannon et al. ............... 264/127 |
| 5,910,277 A * | 6/1999 | Ishino et al. ................... 264/127 |
| 6,261,979 B1 * | 7/2001 | Tanaka et al. ................. 442/370 |
| 6,302,934 B1 | 10/2001 | Nabata et al. |
| 6,852,223 B2 | 2/2005 | Huang et al. |
| 7,306,841 B2 | 12/2007 | Ruefer et al. |

FOREIGN PATENT DOCUMENTS

WO    9706206 A1    2/1997

OTHER PUBLICATIONS

Intellectual Property Office Search Report related to Application No. GB0910902.6 dated Oct. 7, 2009.

* cited by examiner

*Primary Examiner* — Ana M Fortuna
(74) *Attorney, Agent, or Firm* — Armstrong Teasdale LLP

(57) ABSTRACT

A method of making a porous membrane includes, in an exemplary embodiment, mixing together a first fine powder PTFE resin and a second fine powder PTFE resin to form a PTFE resin mixture. The first PTFE resin having a characteristic of forming more and longer fibrils than fibrils formed from the second PTFE resin. The second PTFE resin having a characteristic of forming thicker nodes than nodes formed from the first PTFE resin. The method also includes forming a preform from the PTFE resin mixture, extruding the preform into a tape, passing the tape through a plurality of opposing calender rolls to form a calendered tape having a thickness of about 380 μm to about 1200 μm, and stretching the calendered tape in the transverse direction to form a porous membrane having a plurality of nodes and fibrils and having a thickness of at least about 100 μm.

12 Claims, 3 Drawing Sheets

EXPANDED PFTE MEMBRANE AND METHOD OF MAKING

BACKGROUND OF THE INVENTION

The field of the invention relates generally to porous membranes, and more particularly to expanded polytetrafluoroethylene (ePTFE) membranes.

Porous ePTFE articles/membranes may be utilized in forming many useful articles, such as filters, fabrics, gaskets, and electrical insulation. These ePTFE articles may be produced by blending polytetrafluoroethylene (PTFE) resin with a lubricant, compressing the blended resin into a billet, extruding the billet into an extrudate, calendering the extrudate (if desired), stretching or expanding the extrudate in at least one direction, and optionally sintering the expanded extrudate to form the final article. The ePTFE article may be manufactured in any extruded shape, including sheets, tubes, rods or filaments.

The porous structure of known ePTFE articles is characterized by a plurality of nodes that are connected together by a plurality of fibrils. The nodes are essentially raw dispersion particles of PTFE material. The shape, size and orientation of the nodes and fibrils within the structure can be controlled by varying the expansion rate, expansion ratio, number of expansion axes and other processing parameters to yield many different structures.

Known ePTFE membranes usually are about 25 micrometers (μm) or less in thickness. In some applications it is desirable to employ thicker membranes for increased filtration efficiency. Usually, the increased thickness is achieved by layering ePTFE films by thermal of adhesive lamination. It would be desirable to manufacture increased thickness ePTFE membranes without employing the added steps of laminating several layers of ePTFE films together.

BRIEF DESCRIPTION OF THE INVENTION

In one aspect, a method of making a porous membrane is provided. The method includes mixing together a first PTFE resin and a second PTFE resin to form a PTFE resin mixture. The first PTFE resin having a characteristic of forming more and longer fibrils than fibrils formed from the second PTFE resin. The second PTFE resin having a characteristic of forming thicker nodes than nodes formed from the first PTFE resin. The method also includes forming a preform from the PTFE resin mixture, extruding the preform into a tape, passing the tape through a plurality of opposing calender rolls to form a calendered tape having a thickness of about 380 μm to about 1200 μm, and stretching the calendered tape in the transverse direction to form a porous membrane having a plurality of nodes and fibrils and having a thickness of at least about 100 μm.

In another aspect, a porous expanded PTFE article is provided. The porous expanded PTFE article includes an expanded PTFE resin. The PTFE resin includes a first PTFE resin and a second PTFE resin. The first PTFE resin having a characteristic of forming more and longer fibrils than fibrils formed from the second PTFE resin. The second PTFE resin having a characteristic of forming thicker nodes than nodes formed from the first PTFE resin, and the expanded PTFE article includes a plurality of nodes and fibrils and having a thickness of at least about 100 μm.

In another aspect, a micro-filtration membrane is provided. The micro-filtration membrane is formed as an expanded PTFE membrane. The PTFE membrane includes a first PTFE resin and a second PTFE resin. The first PTFE resin having a characteristic of forming more and longer fibrils than fibrils formed from the second PTFE resin. The second PTFE resin having a characteristic of forming thicker nodes than nodes formed from the first PTFE resin. The expanded PTFE membrane having a plurality of nodes and fibrils and having a thickness of at least about 100 μm.

DETAILED DESCRIPTION OF THE INVENTION

A single layer expanded polytetrafluoroethylene (ePTFE) membrane having a thickness of at least about 100 μm and a method of making the ePTFE membrane is described below in detail. In one embodiment, the ePTFE membrane has a thickness of about 100 μm to about 380 μm. The thicker ePTFE membrane can be used in microfiltration, liquid filtration, and microventing applications. Also, the membrane can be used in heavy duty apparel, for example, work suits and jackets. Increased thickness of the ePTFE membrane provides for increased membrane durability and filtration durability along with improved capture efficiency over known membranes. The thicker ePTFE membrane has increased peel strength and unsupported hydrostatic Mullen strength as compared to known ePTFE membranes having a thickness of 25 μm while maintaining air permeability the same as known ePTFE membranes having a thickness of 25 μm.

Figure 1:
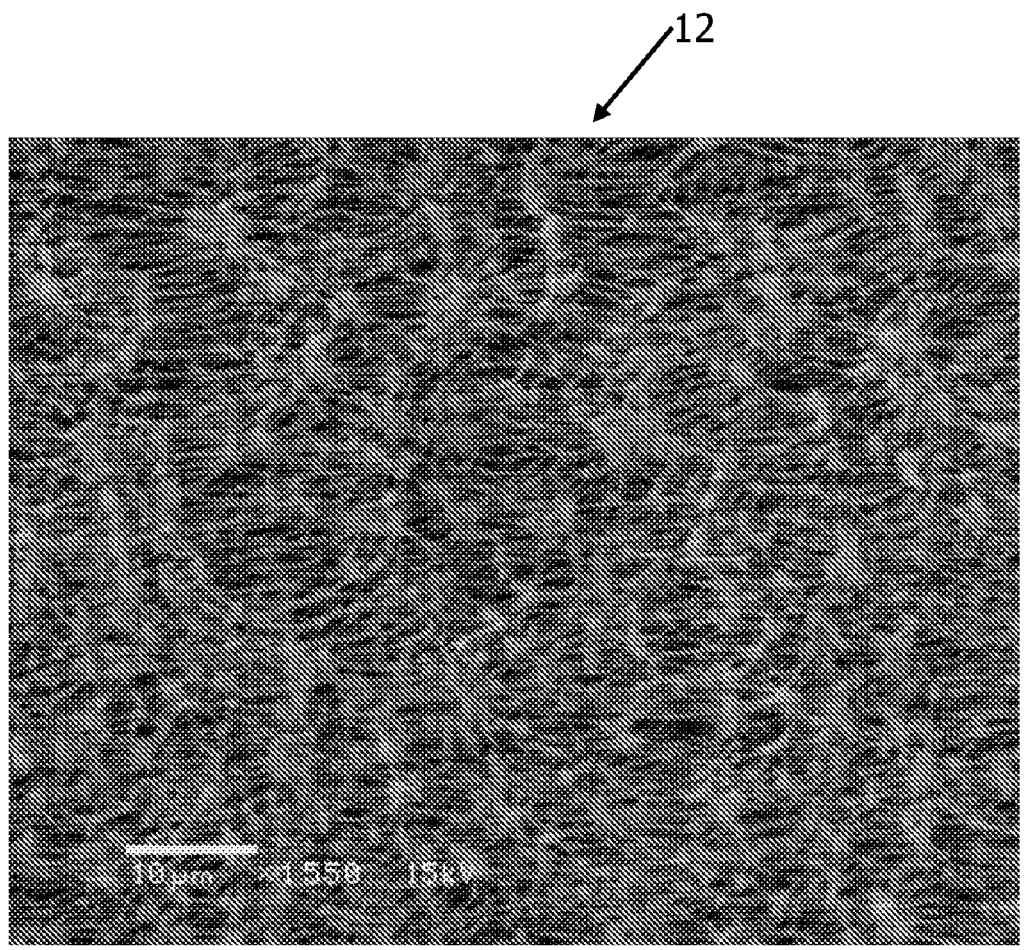
FIG. 1 a photomicrograph of a portion of a portion of a membrane according to an embodiment of the present invention.
Figure 2:
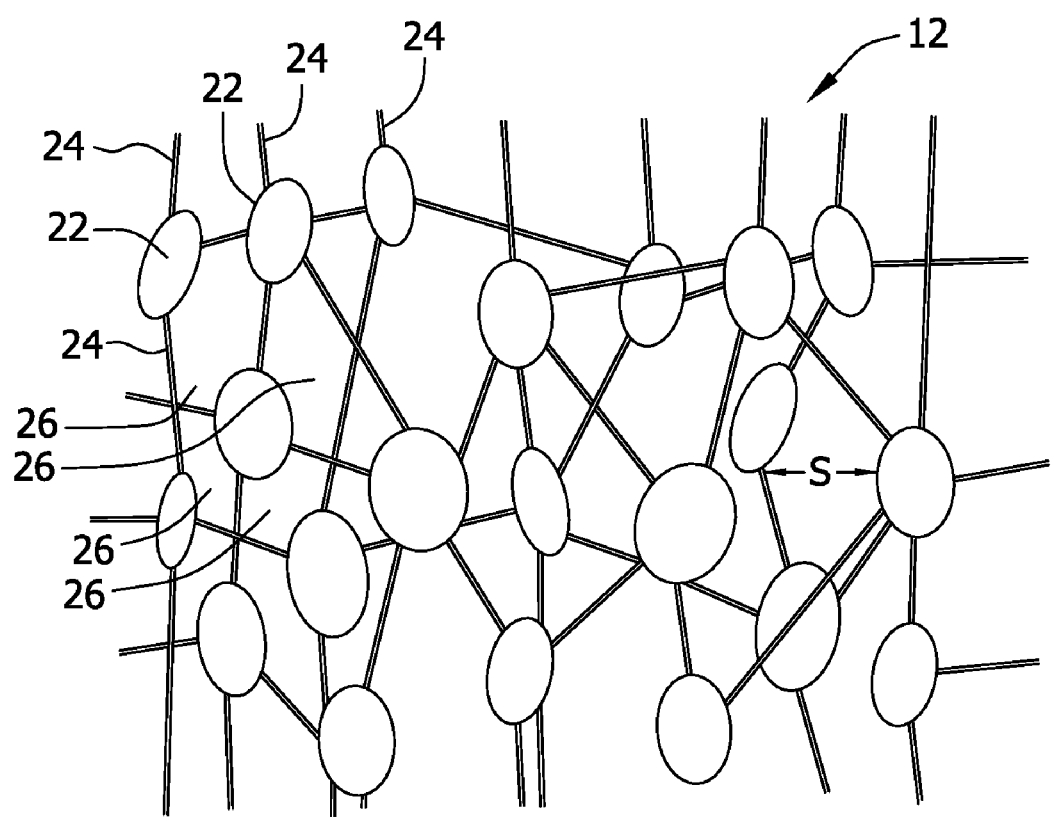
FIG. 2 is an enlarged schematic illustration of the portion of the membrane shown in FIG. 1.

FIG. 1 is a photomicrograph of an exemplary embodiment of a porous ePTFE membrane 12, and FIG. 2 is a schematic illustration of porous ePTFE membrane 12. In one aspect, ePTFE membrane 12 is porous, and in another aspect microporous, with a three-dimensional matrix or lattice type structure of a plurality of nodes 22 interconnected by a plurality of fibrils 24. In one embodiment, ePTFE membrane 12 is at least partially sintered. Generally, the size of a fibril 24 that has been at least partially sintered is in the range of about 0.05 μm to about 0.5 μm in diameter taken in a direction normal to the longitudinal extent of fibril 24. "Expanded" is intended to mean sufficiently stretched beyond the elastic limit of the material to introduce permanent set or elongation to fibrils 24. Membrane 12, in one exemplary embodiment, is heated or "sintered" to reduce and minimize residual stress in the ePTFE material. However, in alternate embodiments, membrane 12 is unsintered or partially sintered as is appropriate for the contemplated use of membrane 12.

Surfaces of nodes 22 and fibrils 24 define numerous interconnecting pores 26 that extend completely through membrane 12 between opposite major side surfaces of membrane 12 in a tortuous path. In one embodiment, the average size S of pores 26 in base membrane 16 is sufficient to be deemed microporous, but any pore size can be used. In one exemplary embodiment, a suitable average size S for pores 26 in base membrane 16 is about 0.01 μm to about 10 μm, and in another embodiment about 0.1 μm to about 5.0 μm.

Membrane 12 is made by mixing together a first PTFE fine powder resin, a second PTFE fine powder resin, and a hydrocarbon lubricating agent to form a mixture of PTFE fine powder resins. Mixing times may vary from about 30 minutes to about one hour. In another embodiment, the mixing time can be greater than one hour. The first PTFE resin has a higher degree of fibrillation during processing than the second PTFE resin. By higher degree of fibrillation is meant that the first PTFE resin has a characteristic of forming more and longer fibrils than the fibrils formed from the second PTFE resin which has a low degree of fibrillation. The longer fibrils facilitates high air permeability of membrane 12. More fibrils tend to increase the strength of the membrane taken in the general direction of the extent of the fibrils. Also, the second PTFE resin has a characteristic of forming thicker nodes than nodes formed from the first PTFE resin. Thicker nodes contributes to the thickness of membrane 12. Mixing together the first PTFE resin and the second PTFE resin includes mixing together about 60% to about 68% by weight of the first PTFE resin, about 15% to about 17% by weight of the second PTFE resin, and about 15% to about 25% by weight of the hydrocarbon lubricating aid, the weight percent based on the total weight of the PTFE resin mixture. In another embodiment, mixing together the first PTFE resin and the second PTFE resin includes mixing together about 66% to about 68% by weight of the first PTFE resin, about 16% to about 17% by weight of the second PTFE resin, and about 15% to about 17% by weight of the hydrocarbon lubricating aid, the weight percent based on the total weight of the PTFE resin mixture. The PTFE resin mixture includes the first PTFE resin and the second PTFE in ratio of about 4 parts first PTFE resin to about one part second PTFE resin.

PTFE resins commercially available from Daikin America, Inc., Orangeburg, N.Y., under the trademark DAIKIN-POLYFLON, and from E. I. du Pont de Nemours and company, Wilmington, Del., under the trademark TEFLON PTFE resins, are suitable for use as first and second PTFE resins. Suitable examples of DAIKIN-POLYFLON resins for use as the first PTFE resin include, but are not limited to, F-107 and F-131 DAIKIN-POLYFLON resins, and suitable examples of DAIKIN-POLYFLON resins for use as the second PTFE resin includes, but are not limited to F-201 and F-205 DAIKIN-POLYFLON resins. Suitable examples of TEFLON PTFE resins for use as the first PTFE resin include, but are not limited to, 601A TEFLON PTFE resin, and suitable examples of TEFLON PTFE resins for use as the second PTFE resin includes, but are not limited to 603A TEFLON PTFE resin. The lubricating agent can be any suitable hydrocarbon solvent, for example mineral spirits, commercially available from Exxon Mobil Chemical under the trademark ISOPAR. Suitable examples of ISOPAR hydrocarbon solvents include, but are not limited to, ISOPAR M and ISOPAR K hydrocarbon solvents.

Figure 3:
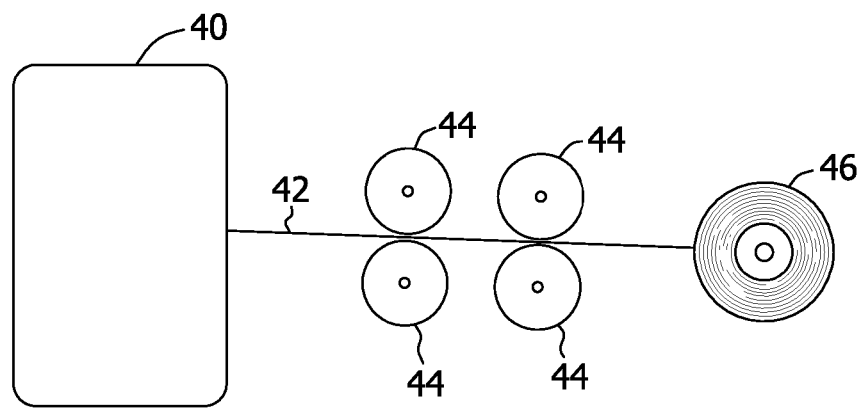
FIG. 3 is a schematic illustration of an exemplary apparatus for extruding and calendering PTFE tape.

Referring also to FIG. 3, the PTFE resin mixture is formed into a preform under pressure. The preform can be any suitable shape, for example a cylindrical shape. The preform is then paste extruded with an extruder 40 into a tape 42 and to form the majority of the fibril structure. Tape 42 is passed through a series of opposing hot calender rolls 44 at a speed of about 10 to about 25 feet per minute to form a calendered tape 46 having a thickness of about 380 µm to about 1200 µm. The temperature of calender rolls 44 are maintained at about 400° F. to about 550° F. to drive off the lubricating aid used in the mixing step.

Figure 4:
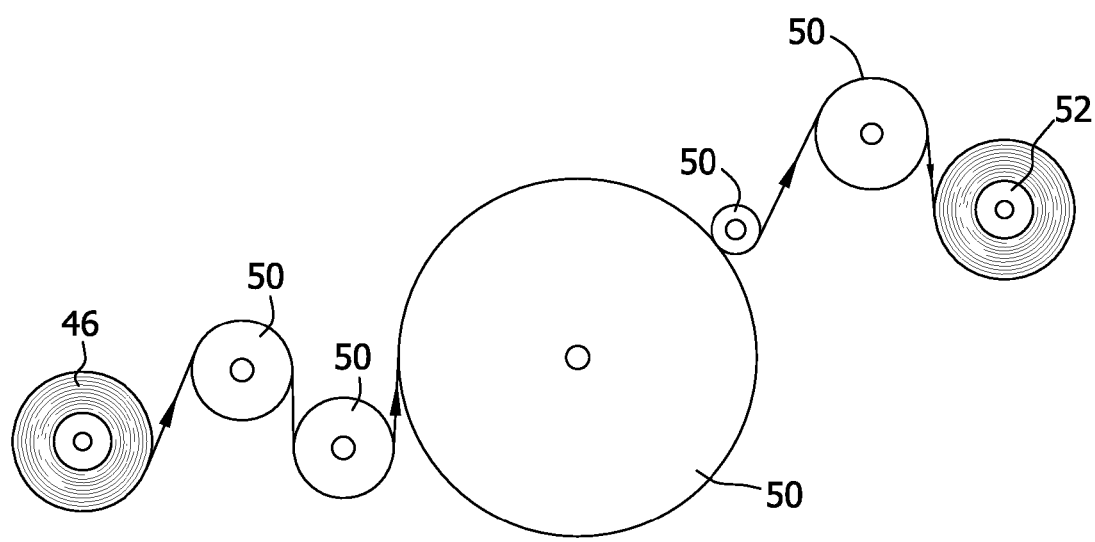
FIG. 4 is a schematic illustration of an exemplary apparatus for stretching calendered PTFE tape.

Referring also to FIG. 4, a tentering, or stretching, or expanding, process stretches calendered tape 46 in the transverse direction (XD) to form porous membrane 12 having a plurality of nodes 22 and fibrils 22 and having a thickness of at least about 100 µm. In the exemplary embodiment the calendered tape is not stretched in the machine direction (MD), only in the transverse direction. In the exemplary embodiment, the calendered tape is stretched in the transverse direction 3 to 15 times. In other embodiments, the calendered tape is stretched in the machine direction from 0 to 12 times. In one embodiment, membrane 12 is formed to have a thickness of about 100 µm to about 380 µm. The stretching process includes passing calendered tape 46 through a plurality of heated stretching rolls 50 at a line speed of about 10 to about 60 feet per minute to stretch calendered tape 46, and then wound on a take-up roll 52. Calendered tape 46 is passed through the stretching process 3 to 15 times to stretch calendered tape 46 in the transverse direction, and 0 to 12 times to stretch calendered tape 56 in the machine direction to achieve the desired thickness and degree of permeability of membrane 12. The maximum temperature of stretching rolls 50 is in the range of about 500° F. to about 680° F.

The resultant ePTFE membrane has a thickness of about 100 µm to about 380 µm while maintaining air and water permeability the same as known ePTFE membranes having a thickness of about 25 µm. In another embodiment, the ePTFE membrane has a thickness of about 100 µm to about 255 µm The table below compares properties of an exemplary embodiment of porous membrane 12 (Sample A) with a known membrane having a thickness of about 25 µm (Sample B).

| Properties | Sample A | Sample B |
|---|---|---|
| Unit weight (oz/yd$^2$) | 1.58 | 0.54 |
| Thickness (µm) | 127 | ~25 |
| Bubble point (psi) | 15-18 | 15-22 |
| Air flow (cfm) | 0.26 | 0.20 |
| Water flow-mL/min/cm$^2$ at 27 in. Hg Vacuum | 17 | 18 |
| Mullen (unsupported) (psi) | 35 | 18 |
| Mullen (supported) (psi) | 80 | 60 |
| Peel strength (lbf/in) | | |
| MD | 1.04 | 0.34 |
| XD | 0.52 | 0.2 |
| Tensile Elongation (%) | | |
| MD | 329 | 350 |
| XD | 41 | 104 |

MD = Machine Direction
XD = Traverse to the Machine Direction

Sample A is about 5 times the thickness of Sample B and has approximately the same air flow and water flow properties as Sample B. In addition, Sample A about two times the hydrostatic Mullen strength and at least two times the peel strength of Sample B in both the machine direction and the traverse direction.

The Mullen hydrostatic test was used to measure physical strength, water resistance (hydrostatic resistance), and water repellency of membrane test sample. A lower surface of a circular test sample was exposed to a predetermined hydrostatic pressure, and the upper surface was examined visually for penetration of water. The highest hydrostatic pressure in pounds per square inch (psi) at which there is no penetration is reported above for Samples A and B.

The peel strength test was used to test the bond strength of a membrane test sample laminated to a fabric material. A tensile test apparatus was used to peel apart the membrane test sample from the fabric. The force measured in pounds force per inch (lbf/in) required to peel the membrane test sample from the fabric is the peel strength.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making a porous membrane, said method comprising:
    mixing together about 60% to about 68% by weight of a first fine powder PTFE resin, about 15% to about 17% by weight of a second fine powder PTFE resin, and about 15% to about 25% by weight of the hydrocarbon lubricating aid, the weight percent based on the total weight of the PTFE resin mixture, to form a PTFE resin mixture, the first PTFE resin having a characteristic of forming more and longer fibrils than fibrils formed from the second PTFE resin, the second PTFE resin having a characteristic of forming thicker nodes than nodes formed from the first PTFE resin;
    forming a preform from the PTFE resin mixture;
    extruding the preform into a tape;
    passing the tape through a plurality of opposing calender rolls to form a calendered tape having a thickness of about 380 μm to about 1200 μm; and
    stretching the calendered tape in a transverse direction to form a porous membrane comprising a plurality of nodes and fibrils, the porous membrane having a thickness of about 100 μm to about 380 μm, and a machine direction peel strength of at least about 1.0 pounds-force per inch.

2. A method in accordance with claim 1, wherein passing the tape through a plurality of opposing calender rolls comprises passing the tape through a plurality of opposing calender rolls at a temperature of about 400° F. to about 550° F.

3. A method in accordance with claim 1, wherein passing the tape through a plurality of opposing calender rolls comprises passing the tape through a plurality of opposing calender rolls at about 10 to about 25 feet per minute.

4. A method in accordance with claim 1, wherein stretching the calendered tape comprises stretching the calendered tape in the transverse direction from about 3 to about 15 times and in the machine direction from 0 to about 12 times.

5. A method in accordance with claim 1, wherein stretching the calendered tape comprises stretching the calendered tape in the transverse direction at a maximum temperature of about 550° F. to about 680° F.

6. A method in accordance with claim 1, wherein stretching the calendered tape comprises stretching the calendered tape in the transverse direction at a line speed of about 10 to about 60 feet per minute.

7. A porous expanded PTFE article comprising:
    an expanded PTFE resin, the PTFE resin comprising about four parts of a first fine powder PTFE resin and about one part of a second fine powder PTFE resin, the first PTFE resin having a characteristic of forming more and longer fibrils than the fibrils formed from the second PTFE resin, the second PTFE resin having a characteristic of forming thicker nodes than nodes formed from the first PTFE resin, said expanded PTFE article comprising a plurality of nodes and fibrils and having a thickness of about 100 μm to about 380 μm and a machine direction peel strength of at least about 1.0 pounds-force per inch.

8. A porous expanded PTFE article in accordance with claim 7, wherein said expanded PTFE article comprising a unit weight of at least about 1.0 ounce per square yard.

9. A porous expanded PTFE article in accordance with claim 7, wherein said expanded PTFE article stretched in the transverse direction from about 3 to about 15 times and in the machine direction from 0 to about 12 times.

10. A micro-filtration membrane comprising:
    an expanded PTFE membrane, the PTFE membrane comprising a first fine powder PTFE resin and a second fine powder PTFE resin, the first PTFE resin having a characteristic of forming more and longer fibrils than fibrils formed from the second PTFE resin, the second PTFE resin having a characteristic of forming thicker nodes than nodes formed from the first PTFE resin, said expanded PTFE membrane comprising a plurality of nodes and fibrils and having a thickness of about 100 μm to about 380 μm, and a machine direction peel strength of at least about 1.0 pounds-force per inch,
    said expanded PTFE membrane comprises said first PTFE resin and said second PTFE in ratio of about 4 parts of said first PTFE resin to about one part of said second PTFE resin.

11. A micro-filtration membrane in accordance with claim 10, wherein said expanded PTFE membrane comprising a unit weight of at least about 1.0 ounce per square yard.

12. A micro-filtration membrane in accordance with claim 10, wherein said expanded PTFE membrane stretched in the transverse direction from about 3 to about 15 times and in the machine direction from 0 to about 12 times.

* * * * *